United States Patent

[11] 3,560,009

| [72] | Inventor | Pierre E. Renoux |
| | | Colombes, France |
| [21] | Appl. No. | 762,798 |
| [22] | Filed | Sept. 26, 1968 |
| [45] | Patented | Feb. 2, 1971 |
| [73] | Assignee | Societe anonyme dite: Cri-Dan |
| | | Paris, France |
| | | a corporation of France |
| [32] | Priority | Oct. 2, 1967 |
| [33] | | France |
| [31] | | 123,019 |

[54] MACHINE-TOOL CHUCK
6 Claims, 5 Drawing Figs.

[52] U.S. Cl............................................. 279/120
[51] Int. Cl............................................. B23b 31/16
[50] Field of Search......................................... 279/1(DC),
1(L), 1(J), 123(O), 66, 113, 120

[56]        References Cited
         UNITED STATES PATENTS
323,279    1885    Costello ........................ 279/113

2,832,604   4/1958   LeBrusque ................... 279/1(J)UX
2,904,339   9/1959   Swanson....................... 279/1(L)UX
            FOREIGN PATENTS
140,884    4/1920   Great Britain................   279/123

Primary Examiner—Robert C. Riordon
Assistant Examiner—Donald D. Evenson
Attorney—Woodhams, Blanchard and Flynn ABSTRACT: A machine tool chuck, as for a lathe, including chuck body having clamping means for tightly holding a workpiece. The clamping means includes a plurality of clamping jaws and a first actuating mechanism for permitting radial displacement of the jaws in a manner to compensate for eccentricity of the workpiece relative to the chuck body. Centering jaws are provided for engaging and centering the workpiece substantially within a machining zone which is spaced axially from one end of the chuck body. The centering jaws are axially withdrawn from engagement with the workpiece by a second actuating mechanism after the clamping jaws engage the workpiece.

PATENTED FEB 2 1971

INVENTOR
PIERRE E. RENOUX
BY
Woodhams, Blanchard & Flynn
ATTORNEYS

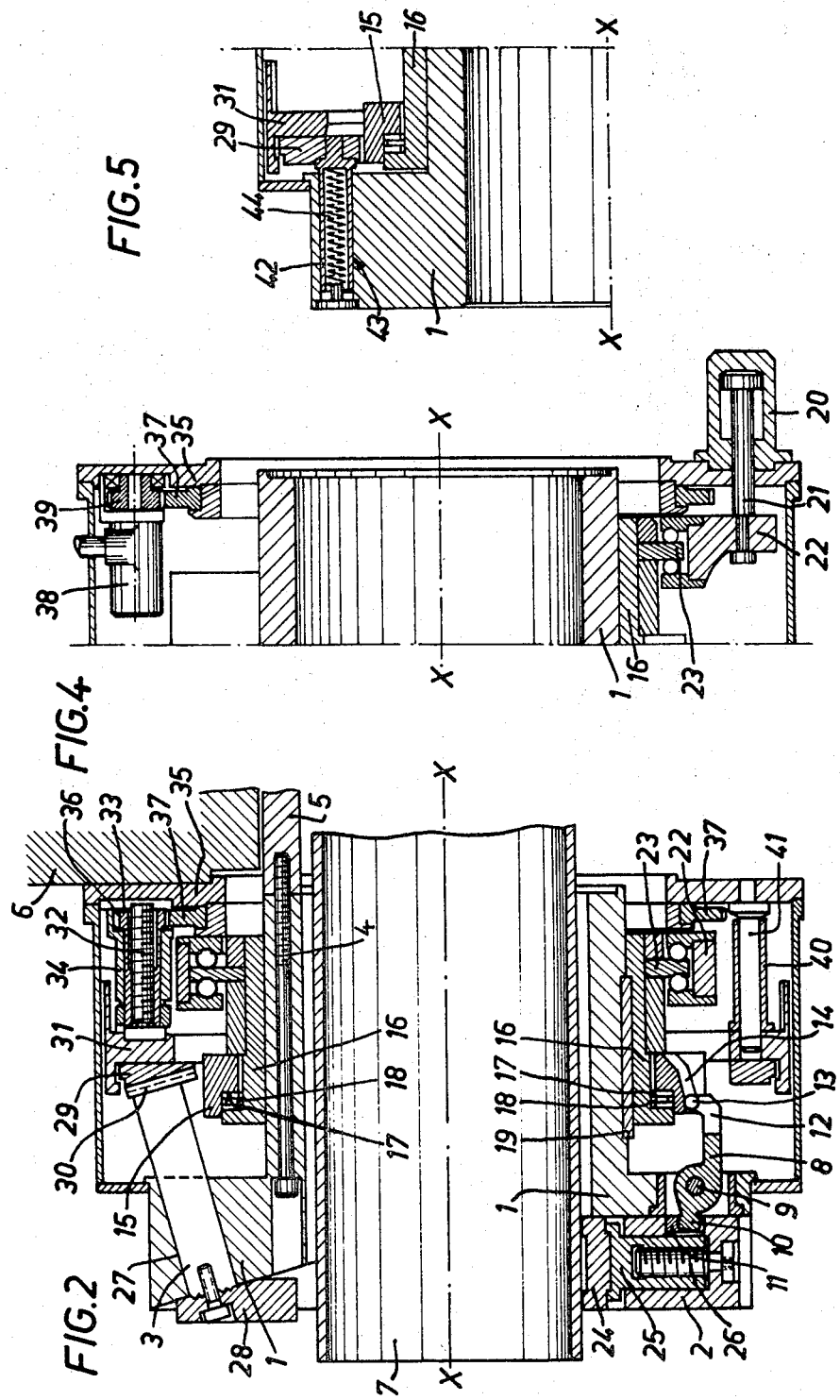

MACHINE-TOOL CHUCK

The present invention relates to a compensation clamping chuck for machine tools of the lathe type and comprising a chuck body which is intended to be mounted on the lathe spindle and adapted to carry a set of clamping jaws actuated by a compensating mechanism.

In machine tools of the lathe type, the chuck which usually has three jaws serves to secure the workpiece to be machined to the spindle of the machine. In the majority of cases, the jaws are actuated mechanically so that they move either towards or away from the axis of rotation of the spindle to an equal extent, thereby ensuring concentric clamping irrespective of the diameter of the workpiece to be chucked.

However, it may prove necessary to drive in rotation a workpiece whose axis of rotation is materialized by centers and whose irregular geometrical shape is incompatible with clamping in a chuck which has three concentric jaws. In this case, use is made of a so-called compensation chuck in which the jaw control which can be manual no longer ensures equidistance of the bearing surface of each jaw with respect to the axis of rotation. The workpiece is accordingly positioned on the machine between centers, one of the centers being usually carried by the chuck itself and the other center being carried by the tailstock.

However, when the workpiece to be chucked is of tubular shape and especially in the case of tubes of substantial length which have to be inserted through the lathe spindle, it is no longer possible to employ centers.

The present invention is primarily intended to make up for this deficiency and is accordingly directed to a clamping chuck of the above-mentioned type which is essentially characterized in that the chuck body also comprises a set of centering jaws with dogs which are displaced towards the machining zone, said jaws being actuated by a second mechanism in order to carry out equal movements of displacement with respect to the axis of rotation of the chuck, said second mechanism being wholly independent of the compensation mechanism which carries out the movements of displacement of the clamping jaws.

By virtue of this arrangement, the part to be machined can first be centered in the machining zone and then clamped without any need of an independent auxiliary centering means.

In practice, and more especially in the case of tubes, the machining operation is often performed on the end of the tube in which both the outer surface and inner surface usually have to be turned at the same time.

Consequently, it is necessary to center the very portion of the outer surface of the tube which is intended to be machined and which cannot therefore be clamped by the chuck. Furthermore, it is essential to ensure that the centering means are applied on said zone only temporarily and prior to commencement of the machining operation.

In accordance with a preferred embodiment of the invention, the centering jaws are each constituted by a rod carrying at one end a dog which is intended to be applied on the outer surface of the part to be machined, each rod being adapted to slide within a recess formed in the chuck body, the axes of the recesses being intended to converge towards the axis of the chuck from the interior of the chuck towards the exterior.

Accordingly, the centering jaws move in synchronism at an oblique angle towards the axis of the chuck from a withdrawn rest position to an outwardly extended work position and conversely. By virtue of this arrangement, the surface to be machined is centered and is entirely freed during the machining operation.

As an advantageous feature, the second mechanism which carries out the movements of displacement of the centering jaws is controlled by means of a rotary motor and a toothed ring which is coaxial with the chuck and driven in rotation by said motor, said toothed ring being in meshing relation with toothed nuts which are associated with screws, the axial movement of said screws being intended to produce the axial displacement of an annular member which is coupled to the rods of the centering jaws by means of tongue and groove assemblies.

As a result of the arrangement hereinabove described, the movements of displacement of the centering jaws are carried out in the same directions and are of strictly equal amplitude thereby ensuring accurate centering of the part to be machined.

A clear understanding of the invention will in any case be obtained from the following description, reference being made to the accompanying drawings in which one form of construction is illustrated by way of nonlimitative example, and in which:

FIG. 2 is a view in axial cross section taken along line II–II of FIG. 1 and showing a clamping jaw in the withdrawn position;

FIG. 4 is a partial view in axial cross section taken along lines IV–IV of FIG. 1; and FIG. 5 is a partial half-view in axial cross section taken along line V of FIG. 1.

Figure 1:
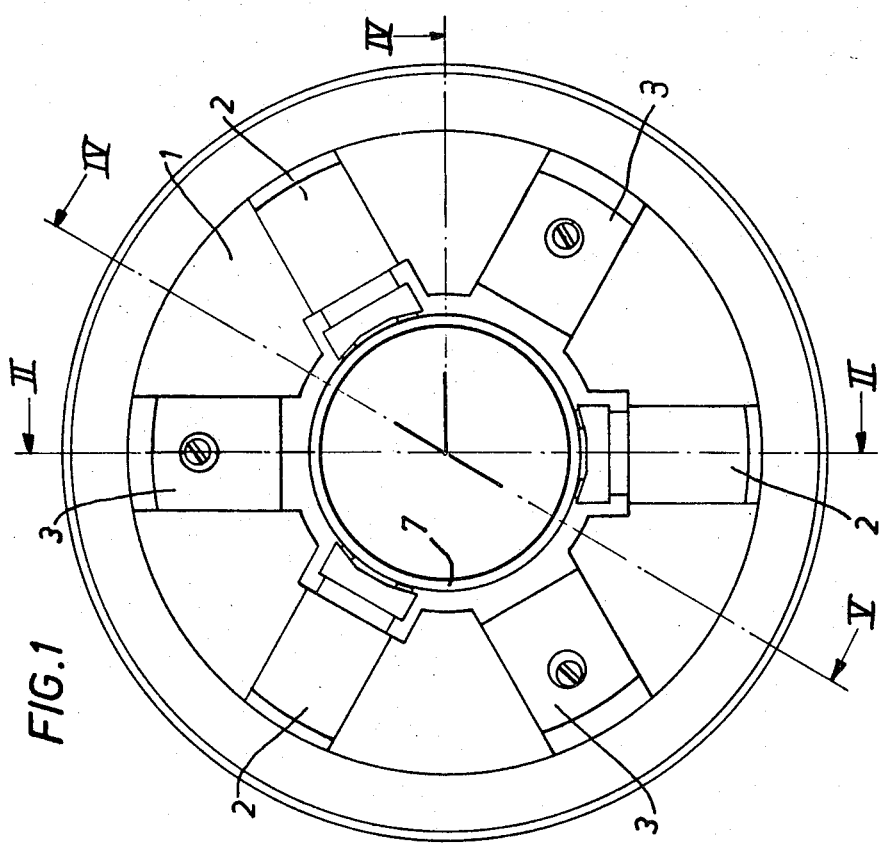
FIG. 1 is a simplified front view of a clamping chuck in accordance with the invention.

Referring more especially to FIGS. 1 and 2, it is apparent that the chuck in accordance with the invention is essentially made up of a chuck body 1 in which clamping jaws 2 and centering jaws 3 are slidably mounted. In the example herein described, there are three clamping jaws and three centering jaws uniformly disposed at angular intervals of 60° and in alternate sequence; a greater number of jaws could be provided but at least three of each type are required.

The chuck body 1 is secured by means of screws 4 to the spindle 5 of a machine tool of the lathe type, a part of the frame of the machine tool being shown at 6. There is also shown at 7 a tube whose extremity is intended to be turned on the machine tool or lathe and said tube is intended to pass entirely through the spindle 5 along the axis of rotation thereof which is materialized by the line X—X.

The clamping jaws 2 are operated by a compensation mechanism of known type whereby said jaws may be caused to close or open at will while making it possible within certain limits to compensate for any geometrical defects of the clamped surface with respect to the centered surface of the part to be machined. Said mechanism comprises levers 8 which are pivoted about pins 9 carried by the chuck body 1, each lever being adapted to actuate one of the jaws 2 by means of a ball-shaped extremity 10 which is adapted to cooperate with spherical rings 11 housed in the chuck body. The other extremity 12 of each lever 8 is provided with spindles 13 and these latter are adapted to cooperate with guide ramps 14 formed in a ring 15. Said ring 15 is coaxial with the chuck, is guided by a sleeve 16 and is provided with a small amount of play with respect to this latter.

A series of alternately arranged discs 17 and 18 are interposed between the ring 15 and the sleeve 16. The discs 17 are centered without play within the ring 15 but have a small amount of play with respect to the sleeve 16 whereas the discs 18 are centered without play on the sleeve 16 and have a small amount of play with respect to the ring 15. The number of discs 17 and 18 is determined as a function of the minimum clamping force which the chuck is required to exert.

The sleeve 16 is adapted to slide axially along the chuck body 1 but is driven in rotation with this latter by means of one or a number of guide keys 19. The axial displacement of said sleeve 16 is carried out by jacks which are three in number in this example and one of which is shown at 20 in FIG. 4. Said jacks 20 are preferably of the type in which a fluid such as air or a liquid is supplied under pressure and are fixed with respect to the frame 6 of the machine. The jack pistons 21 are rigidly fixed to an annular member 22 which is coupled to the sleeve 16 by means of a ball thrust bearing 23 or any other suitable rotary sealing member such as, for example, a pad thrust or roller thrust bearing. It is therefore clear that, depending on whether the pressure of the fluid is exerted on either one face of the pistons 21 or the other, the sleeve 16 is displaced in one direction or in the other and consequently causes either the closing or opening movement of the jaws 2.

In a preferred embodiment of the invention, the clamping jaws 2 are provided with interchangeable dogs 24 whereby said jaws are permitted to rest on the outer surface of the tube 7. Each dog 24 is mounted on a sliding member such as the member 25 whose radial position with respect to the chuck body 1 can be adjusted by means of a screw 26. However, this form of construction is not essential and the clamping jaws could very easily be made in one piece.

Figure 3:
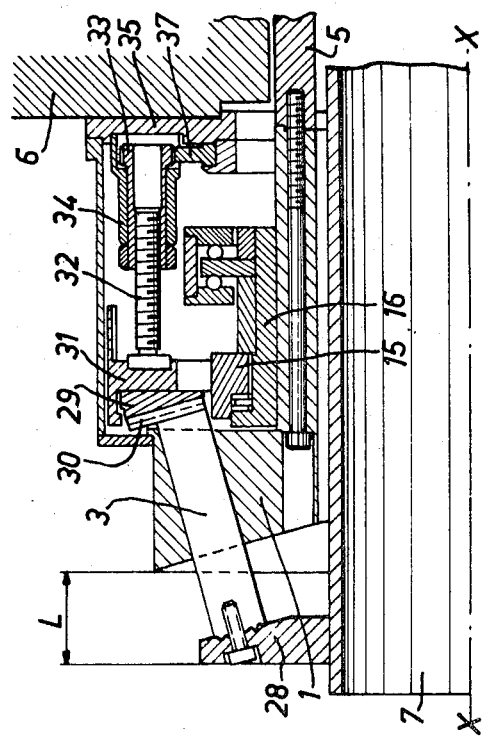
FIG. 3 is a half-view in cross section which is similar to that of FIG. 2 but in which the clamping jaws are shown in the outwardly extended position.

So far as the centering jaws 3 are concerned, they are essentially made up of a rod of cylindrical shape which is adapted to slide at an oblique angle within a recess 27 formed in the chuck body 1. Each jaw is adapted to carry at its extremity an interchangeable dog such as the dog 28, the dimensions of which are determined so as to come into contact with the outer surface of the tube 7 to be centered at a suitable distance L from the front face of the chuck as is illustrated in FIG. 3. The other extremity of each jaw is coupled to an annular member 29 by means of a sliding assembly 30 of the tongue and groove type. Said annular member 29 is driven axially by means of another annular member 31 and is freely rotatable with respect to this latter by virtue of the play which is provided on assembly. The annular member 31 is fixed in rotation with respect to the frame 6 of the machine whereas the annular member 29 is riven in rotation with the chuck by means of the jaws 3 and their assemblies 30.

The axial displacement of the annular member 31 is produced by mechanical jacks which are three in number in this example. Each jack is made up of a screw 32 which is rigidly fixed to the annular member 31 and a nut 33 which is rotatably mounted in a bearing 34, said bearing being secured to the frame 6 of the machine by means of a common base plate 35. The nuts 33 are provided with a peripheral set of gear teeth 36 which are adapted to engage with a common toothed ring 37, said ring being carried and guided by the base plate 35 and freely rotatable with respect to this latter The toothed ring 37 can be driven in rotation by any suitable means such as, for example, an electric or hydraulic motor 38 which is visible in FIG. 4. The output shaft of said motor carries a pinion 39 which is adapted to engage with said ring gear. Thus, according as the motor 38 is caused to rotate either in one direction or in the other, the centering jaws 3 are caused to move outwards from the chuck towards the tube 7 or away from this latter and withdrawn into the chuck body 1, these two positions being shown respectively in FIGS. 3 and 2.

In an embodiment of the invention which is preferred but not essential, the annular member 31 is provided with sleeves 40 which are adapted to slide on guides 41 carried by the base plate 35. The function of said guides is to prevent any harmful bending stresses which might otherwise be exerted on the mechanical jacks 32—33 as a result of the weigh of the annular member 31. For similar reasons, as is shown in FIG. 5, the annular member 29 is provided with at least two guide sleeves 42 which are adapted to slide within bores 43 formed in the chuck body 1. Moreover, the annular member 29 is continuously subjected to the action of restoring springs 44 which tend to urge the ring away from the rear face of the chuck body 1.

The chuck in accordance with the invention which has just been described operates as follows:

At the outset, the clamping jaws 2 are open and the centering jaws 3 are in the withdrawn position as shown in FIG. 2. The tube 7 to be machined is then inserted through the spindle 5 of the machine until the desired axial position is reached and the motor 38 is actuated in the direction of rotation which causes the outward displacement of the centering jaws 3. Said jaws 3 therefore move at an oblique angle towards the front extremity of the tube 7 which is precisely the portion of the tube which is to be machined and which must consequently be accurately centered with respect to the axis of rotation X-X of the spindle 5. When the dogs 28 of the jaws come into contact with the outer surface of the tube at a distance L from the front face of the chuck body 1 as shown in FIG. 3, the movement of translation of the annular member 31 encounters a rapidly increasing resistance which finally counterbalances the torque of the motor 38 and the latter comes to a standstill.

By virtue of the coupling system in accordance with the invention, when the motor 38 drives the toothed ring 37 in rotation by means of its pinion 39, the nuts 33 of each jack always rotate to an equal extent. As a result, the axial translational motion of the annular member 31 produces a simultaneous and strictly equal displacement of the three jaws 3, thereby ensuring very accurate centering of the tube 7 or more precisely of the front portion thereof which is the portion to be machined on the machine tool.

Since the portion of the tube 7 to be machined is thus centered with precision, the jacks 20 are actuated in the direction of clamping of the jaws 2. By virtue of the property compensation of the drive system, the dogs 24 are applied against the outer surface of the tube without exerting any stress other than a balanced clamping force between the different jaws 2. The friction forces generated by the axial thrust of the jacks 20 between the surfaces of the discs 17 and 18 and the corresponding surfaces of the sleeve 16 and of the ring 15 have the effect of immobilizing said ring 15 and ensuring irreversibility of the compensation movement.

The tube 7 is therefore firmly held by the clamping jaws 2 in a position such that the front portion to be machined is centered. The motor 38 is then actuated in the opposite direction, thereby having the effect of releasing the jaws 3 and withdrawing them completely to the position shown in FIG. 2. The machining zone of the tube is thus entirely freed and is centered with respect to the axis of rotation X-X of the spindle 5.

When the centering jaws 3 take up their retracted positions, they are maintained in this position by the annular member 29 which is subjected to the action of the restoring springs 44. In consequence, the supply to the motor 38 is cut off and machining of the tube 7 may then be begun.

It should be pointed out that the assembly between the annular members 29 and 31 is so adjusted that, when the centering jaws 3 are retracted and the jacks 32—33 have been brought to the end of travel, there is no contact between said two annular members. Thus, the movement of rotation of the chuck is carried out without any harmful friction.

It will in any case be apparent that the form of execution of the invention which has just been described has been given solely by way of nonlimitative example and that a large number of modifications can be contemplated without thereby departing from the scope or the spirit of the invention.

I claim:

1. A machine tool chuck, as for a lathe, comprising:
    an annular chuck body adapted to be mounted on a machine tool;
    clamping means for tightly holding a workpiece relative to said chuck body, said clamping means including a plurality of clamping jaws movably mounted on said chuck body and first actuating mechanism connected to said clamping jaws for causing radial displacement of said clamping jaws relative to the central axis of said chuck body into tight clamping engagement with said workpiece, said first actuating mechanism permitting said clamping jaws to be displaced nonconcentrically relative to said axis of said chuck body to compensate for an eccentricity of the workpiece relative to the chuck body;
    centering jaws for engaging and centering the workpiece substantially within a machining zone spaced axially from one end of the chuck body, said centering jaws being withdrawn from engagement with the workpiece after engagement thereof by said clamping jaws; and
    second actuating mechanism interconnecting said chuck body to said centering jaws for causing axial movement of said centering jaws relative to said chuck body between a retracted position and a centering position wherein said centering jaws engage the workpiece at an axial location spaced outwardly from the adjacent end of said chuck body, the centering jaws when in the centering position being substantially within the desired machining zone and being axially spaced from the location where said clamping jaws engage the workpiece, said second actuating mechanism being independent of said first actuating mechanism and causing equal displacement of said centering jaws relative to said axis of the chuck body as the centering jaws are axially moved to the centering position, the centering jaws being withdrawn from the centering position being to the retracted position after the workpiece has gripped by said clamping jaws for permitting machining of said workpiece in said zone.

2. A machine tool chuck according to claim 1, wherein said centering jaws are mounted on said chuck body for substantially linear movement between said retracted and said centering positions, the line of movement of said centering jaws extending at an acute angle relative to said axis of said chuck body.

3. A machine tool chuck according to claim 2, wherein said chuck body includes wall means defining a recess therein with said recess having a longitudinally extending axis, the axis of said recess intersecting said axis of the chuck body and being inclined at an angle of less than 90° relative thereto, a said centering jaw being slideably received within said recess whereby the centering jaw is thus simultaneously movable both axially and radially relative to the chuck body when slideably moved within said recess.

4. A machine tool chuck according to claim 2, wherein each centering jaw comprises an elongated rod having a dog secured to the end thereof with said dog being adapted to engage a peripheral surface of the workpiece, the chuck body having a plurality of elongated recesses therein with one of said rods being slideably received within each of said recesses, each of said recesses having a longitudinal axis which substantially intersects and extends at an acute angle relative to said axis of said chuck body, the longitudinal axes of said recesses converging toward said axis of the chuck body as they extend outwardly beyond said one end of said chuck body.

5. A chuck in accordance with claim 4, characterized in that the second mechanism which carries out the movements of displacement of the centering jaws is controlled by means of a rotary motor and a toothed ring which is coaxial with the chuck and driven in rotation by said motor, said toothed ring being in meshing relation with toothed nuts which are associated with screws, the axial movement of said screws being intended to produce the axial displacement of an annular member which is coupled to the rods of the centering jaws by means of tongue and groove assemblies.

6. A machine tool chuck according to claim 1, including means associated with said second actuating mechanism for causing said centering jaws to be retracted from said centering position to said retracted position after said clamping jaws have been moved into clamping engagement with said workpiece, whereby a machine tool is able to contact the workpiece where it is concentric with the chuck body.